US012039960B2

(12) United States Patent
Kojima et al.

(10) Patent No.: US 12,039,960 B2
(45) Date of Patent: Jul. 16, 2024

(54) RESONANCE SOUND SIGNAL GENERATION METHOD, RESONANCE SOUND SIGNAL GENERATION DEVICE, NON-TRANSITORY COMPUTER READABLE MEDIUM STORING RESONANCE SOUND SIGNAL GENERATION PROGRAM AND ELECTRONIC MUSICAL APPARATUS

(71) Applicant: Yamaha Corporation, Hamamatsu (JP)

(72) Inventors: Hiroyuki Kojima, Hamamatsu (JP); Masafumi Nakata, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 235 days.

(21) Appl. No.: 17/012,156

(22) Filed: Sep. 4, 2020

(65) Prior Publication Data

US 2021/0074250 A1 Mar. 11, 2021

(30) Foreign Application Priority Data

Sep. 5, 2019 (JP) ................................ 2019-162224

(51) Int. Cl.

*G10H 1/00* (2006.01)
*G10H 1/08* (2006.01)
*G10H 1/12* (2006.01)

(52) U.S. Cl.

CPC ............ *G10H 1/0091* (2013.01); *G10H 1/08* (2013.01); *G10H 1/125* (2013.01); *G10H 2210/271* (2013.01)

(58) Field of Classification Search

CPC ........ G10H 1/0091; G10H 1/08; G10H 1/125; G10H 2210/271
USPC ........................................................... 84/622
See application file for complete search history.

(56) References Cited

U.S. PATENT DOCUMENTS 4,909,121 A * 3/1990 Usa ........................ G10H 7/008 84/622
5,500,486 A * 3/1996 Smith, III .............. G10H 5/007 84/622
5,804,751 A * 9/1998 Koseki ..................... G10H 1/08 84/630

(Continued)

FOREIGN PATENT DOCUMENTS

JP 4-134495 A 5/1992
JP H04134495 A * 5/1992

(Continued)

OTHER PUBLICATIONS

Japanese-language Office Action issued in Japanese Application No. 2019-162224 dated Aug. 8, 2023 with English translation (9 pages).

(Continued)

*Primary Examiner* — Christina M Schreiber
(74) *Attorney, Agent, or Firm* — Crowell & Moring LLP

(57) ABSTRACT

A resonance sound signal generation method includes providing an instruction configured to generate a sound signal corresponding to a received pitch and producing a resonance sound signal. The method also includes receiving a multiple damper operation with respect to a plurality of pitches in a first pitch range. The method also includes providing an instruction configured to produce the resonance sound signal based on an additional sound relating to the multiple damper operation when the multiple damper operation is received.

13 Claims, 5 Drawing Sheets

(56) References Cited

U.S. PATENT DOCUMENTS

| | | | | | |
|---|---|---|---|---|---|
| 5,854,438 | A * | 12/1998 | Assayag | G10H 1/0091 | 84/625 |
| 7,642,445 | B2 * | 1/2010 | Izumisawa | G10H 1/0575 | 84/622 |
| 7,767,899 | B2 * | 8/2010 | Fujita | G10H 1/348 | 84/622 |
| 8,378,201 | B2 * | 2/2013 | Sato | G10H 1/186 | 84/622 |
| 2001/0027714 | A1 * | 10/2001 | Kondo | G10H 1/057 | 84/615 |
| 2007/0175318 | A1 * | 8/2007 | Izumisawa | G10H 1/0091 | 84/626 |
| 2008/0245213 | A1 * | 10/2008 | Izumisawa | G10H 1/0575 | 84/604 |
| 2012/0247306 | A1 * | 10/2012 | Shimizu | G10H 5/007 | 84/616 |
| 2015/0221296 | A1 * | 8/2015 | Nakata | G10H 1/06 | 84/725 |
| 2015/0228261 | A1 * | 8/2015 | Nakata | G10H 1/44 | 84/622 |
| 2018/0182364 | A1 * | 6/2018 | Sakata | G10H 1/0008 | |
| 2018/0182365 | A1 * | 6/2018 | Sakata | G10H 1/125 | |
| 2019/0341012 | A1 * | 11/2019 | Liu | G10K 15/12 | |
| 2019/0341013 | A1 * | 11/2019 | Liu | G10D 3/10 | |
| 2020/0112642 | A1 * | 4/2020 | Makino | G10H 1/18 | |
| 2021/0074250 | A1 * | 3/2021 | Kojima | G10H 1/057 | |
| 2021/0295806 | A1 * | 9/2021 | Sakata | G10H 1/08 | |

FOREIGN PATENT DOCUMENTS

| | | | | |
|---|---|---|---|---|
| JP | 2001-236064 | A | 8/2001 | |
| JP | 2001-242867 | A | 9/2001 | |
| JP | 3633420 | B2 * | 3/2005 | G10H 1/057 |
| JP | 3633420 | B2 * | 5/2005 | G10H 1/057 |
| JP | 2006064821 | A * | 3/2006 | |
| JP | 2015-143764 | A | 8/2015 | |
| JP | 2018-106006 | A | 7/2018 | |

OTHER PUBLICATIONS

German-language Office Action issued in German Application No. 10 2020 122 697.7 dated Oct. 13, 2023 with English translation.

Chinese-language Office Action issued in Chinese Application No. 202010917065.8 dated Nov. 7, 2023 with English translation (14 pages).

Japanese-language Office Action issued in Japanese Application No. 2019-162224 dated Dec. 26, 2023 with English translation (8 pages).

* cited by examiner

RESONANCE SOUND SIGNAL GENERATION METHOD, RESONANCE SOUND SIGNAL GENERATION DEVICE, NON-TRANSITORY COMPUTER READABLE MEDIUM STORING RESONANCE SOUND SIGNAL GENERATION PROGRAM AND ELECTRONIC MUSICAL APPARATUS

BACKGROUND

Technical Field

The present disclosure relates to a resonance sound signal generation method and a resonance sound signal generation device for generating a resonance sound signal, a non-transitory computer readable medium storing a resonance sound signal generation program and an electronic musical apparatus including the resonance sound signal generation device.

Description of Related Art

In an acoustic piano, a plurality of dampers are provided at positions respectively corresponding to strings. When a damper pedal is depressed, all of the dampers in contact with respective strings are released from the strings. When a player depresses a key while depressing the damper pedal, the string corresponding to the depressed key vibrates, and a resonance sound is generated due to vibration of all other strings.

An existing electronic musical instrument produces a resonance sound. This electronic musical instrument is to simulate a resonance sound in an acoustic piano by convolving impulse response waveform data with musical sound waveform data.

SUMMARY

When a damper pedal is depressed by a player in an acoustic piano, a sound is generated because a damper rubs against a string as moving away from the string. Alternatively, when an operation of releasing depression of the damper pedal is performed by the player, a sound is generated by the contact of the damper with the string. Meanwhile, a damper is not physically present in the electronic musical instrument, so that such a sound corresponding to an operation of the damper pedal is not generated. Further, the sound generated in correspondence with this operation of the damper pedal is irrelevant to original performance. However, the player expects an electronic musical instrument to behave similarly to an acoustic piano in order to obtain a feeling of more realistic live performance.

An object of the present disclosure is to provide a resonance sound signal generation method and a resonance sound signal generation device for enabling generation of a sound more similar to a sound to be generated in an acoustic piano, a non-transitory computer readable medium storing a resonance sound signal generation program and an electronic musical apparatus.

A resonance sound signal generation method according to one aspect of the present disclosure includes providing an instruction for generating a sound signal corresponding to a received pitch, producing a resonance sound signal, receiving a multiple damper operation with respect to a plurality of pitches in a first pitch range, and providing an instruction for producing the resonance sound signal based on an additional sound relating to the multiple damper operation when the multiple damper operation is received.

The additional sound may include a sample waveform produced in advance.

The additional sound may be produced by execution of a waveform process on random noise.

The additional sound may be produced by combination of a plurality of types of sounds.

The additional sound may be controlled in accordance with operation information of the multiple damper operation.

The providing an instruction for producing the resonance sound signal may be providing an instruction for combining the additional sound at a predetermined ratio with the resonance sound signal produced based on the additional sound.

The receiving the multiple damper operation may include receiving an application or a release of a damper effect with respect a plurality of pitches in the first pitch range to which the damper effect is applied.

A resonance sound signal generation device according to another aspect of the present disclosure includes a sound signal instructor that provides an instruction for generating a sound signal corresponding to a received pitch, a resonance sound producer that produces a resonance sound signal, a multiple damper operation receiver that receives a multiple damper operation with respect to a plurality of pitches in a first pitch range, and a resonance sound instructor that instructs the resonance sound producer to produce the resonance sound signal based on an additional sound relating to the multiple damper operation when the multiple damper operation is received in the multiple damper operation receiver.

A non-transitory computer readable medium according to yet another aspect of the present disclosure stores a resonance sound signal generation program. The resonance sound generation program causes a computer to execute a process of providing an instruction for generating a sound signal corresponding to a received pitch, a process of producing a resonance sound signal, a process of receiving a multiple damper operation with respect to a plurality of pitches in a first pitch range, and a process of providing an instruction for producing the resonance sound signal based on an additional sound relating to the multiple damper operation when the multiple damper operation is received.

An electronic musical apparatus according to yet another aspect of the present disclosure includes the above-mentioned resonance sound signal generation device, a tone generator that generates a sound signal of the additional sound as instructed by the resonance sound signal generation device, and an outputter that outputs a resonance sound of the additional sound based on the resonance sound signal produced by the resonance sound signal generation device.

Other features, elements, characteristics, and advantages of the present disclosure will become more apparent from the following description of preferred embodiments of the present disclosure with reference to the attached drawings.

DETAILED DESCRIPTION

A resonance sound signal generation device, a resonance sound signal generation method, a non-transitory computer readable medium storing a resonance sound generation program and an electronic musical apparatus according to embodiments of the present disclosure will be described below in detail with reference to drawings.

(1) Configuration of Electronic Musical Apparatus

Figure 1:
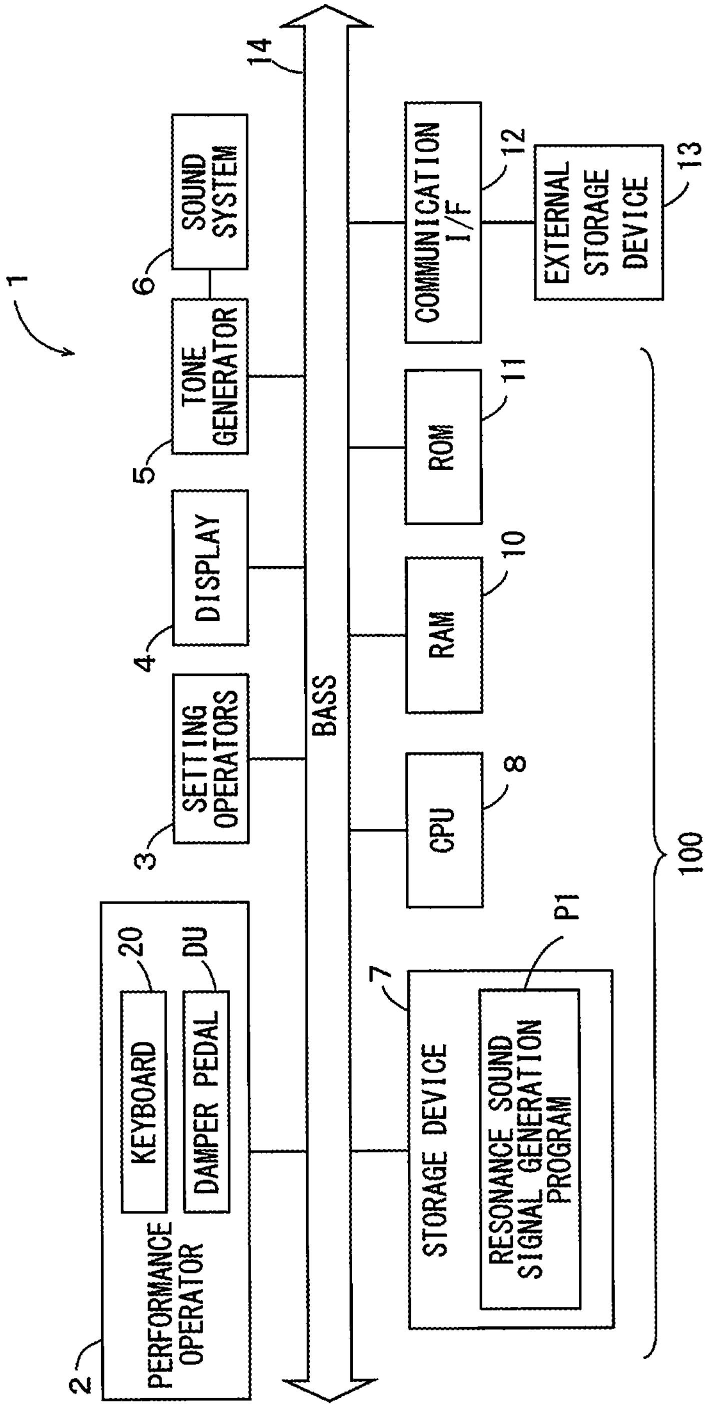
FIG. 1 is a block diagram showing the configuration of an electronic musical apparatus including a resonance sound signal generation device according to an embodiment of the present disclosure.

FIG. 1 is a block diagram showing the configuration of the electronic musical apparatus 1 including the resonance sound signal generation device 100 according to an embodiment of the present disclosure. Since being a device that electronically generates a sound, the electronic musical apparatus 1 including the resonance sound signal generation device 100 of the present embodiment does not have a string or a damper. An object of the electronic musical apparatus 1 including the resonance sound signal generation device 100 of the present disclosure is to provide a performance feeling to a player similarly to an acoustic piano by artificially generating a sound that is to be generated in response to an operation of a damper pedal.

The electronic musical apparatus 1 of FIG. 1 is an electronic keyboard musical instrument, for example. The electronic musical apparatus 1 comprises a performance operator 2, setting operators 3 and a display 4. In the present embodiment, the performance operator 2 includes a keyboard 20 and a damper pedal DU and is connected to a bus 14. The keyboard 20 of the performance operator 2 may be an image of a keyboard displayed on a screen of a touch panel display mentioned below.

The setting operators 3 include operation switches that are operated in an on-off manner, operation switches that are operated in a rotational manner or operation switches that are operated in a sliding manner, etc., and are connected to the bus 14. The setting operators 3 are used for various settings including adjustment of the volume and on-off of a power supply. The display 4 includes a liquid crystal display, for example, and is connected to the bus 14. A name of a musical piece, a music score or other various information is displayed on the display 4. The display 4 may be a touch panel display. In this case, part or all of the performance operator 2 or the setting operators 3 may be displayed on the display 4. The player can provide instructions for various operations by operating the display 4.

The electronic musical apparatus 1 includes a tone generator 5 and a sound system 6. The tone generator 5 is connected to the bus 14 and outputs audio data (an audio signal) based on a pitch designated by an operation of the performance operator 2. The audio data is sampling data (PCM (Pulse-Code Modulation) data, for example) representing the waveform of a sound. Hereinafter, audio data that is output by the tone generator 5 is referred to as a sound signal. The tone generator 5 stores sound signals of all pitches in advance. Further, the tone generator 5 stores a sound signal of an additional sound relating to a multiple damper operation mentioned below. The sound system 6 includes a digital-analog (D/A) conversion circuit, an amplifier and a speaker. The sound system 6 converts a sound signal supplied from the tone generator 5 into an analogue sound signal and generates a sound on the basis of the analogue sound signal. The sound system 6 is an example of an outputter in the present disclosure.

The electronic musical apparatus 1 further includes a storage device 7, a CPU (Central Processing Unit) 8, a RAM (Random Access Memory) 10, a ROM (Read Only memory) 11 and a communication I/F (interface) 12. The storage device 7, the CPU 8, the RAM 10, the ROM 11 and the communication I/F 12 are connected to the bus 14. An external apparatus such as an external storage device 13 may be connected to the bus 14 via the communication I/F 12.

The storage device 7 includes a storage medium such as a hard disc, an optical disc, a magnetic disc or a memory card. A computer program such as the resonance sound signal generation program P1 is stored in the storage device 7.

The RAM 10 is a volatile memory, for example, which is used as a working area for the CPU 8, and temporarily stores various data. The ROM 11 is a non-volatile memory, for example, and stores a control program. The ROM 11 may store a computer program such as the resonance sound signal generation program P1. The CPU 8 executes the resonance sound signal generation program P1 stored in the storage device 7 or the ROM 11 to perform the resonance sound signal generation method mentioned below. The storage device 7, the CPU 8, the RAM 10 and the ROM 11 constitute the resonance sound signal generation device 100.

The resonance sound signal generation program P1 may be supplied in the form of being stored in a recording medium which is readable by a computer, and installed in the storage device 7 or the ROM 11. Further, the resonance sound signal generation program P1 may be stored in the external storage device 13. Further, in a case where the communication I/F 12 is connected to a communication network, the resonance sound signal generation program P1 delivered from a server connected to a communication network may be installed in the storage device 7 or the ROM 11.

(2) Configuration of Performance Operator 2

Figure 2:
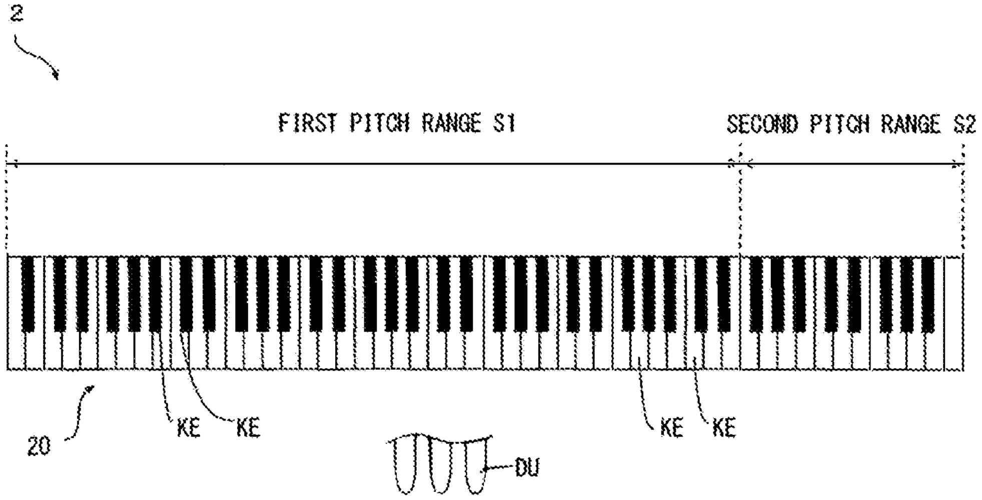
FIG. 2 is a diagram showing a performance operator according to the embodiment.

FIG. 2 is a schematic diagram showing the keyboard 20 and the damper pedal DU included in the performance operator 2 of FIG. 1. As shown in FIG. 2, the keyboard 20 has a plurality of keys KE arranged in a row. Pitches that ascend in order from the left to the right are assigned to the plurality of keys KE arranged in a row. In the present embodiment, the keyboard 20 includes 88 keys KE. However, the number of keys included in the keyboard 20 is not limited to this.

In the keyboard 20 in the present embodiment, 88 keys KE are divided into two pitch ranges as shown in FIG. 2. A first pitch range S1 has the function similar to the function of a key having a damper in an acoustic piano. A second pitch range S2 has the function similar to a key not having a damper in an acoustic piano. That is, with no key KE depressed by the player, the control is carried out similarly to a case where a damper effect is applied to all of the keys KE in the first pitch range S1. In a case where any key KE is depressed by the player, the control is carried out similarly to a case where a damper effect applied to the depressed key KE is released from the depressed key KE.

The damper pedal DU is a pedal operated by the player and arranged to be close to player's feet. As described above, the keys KE in the first pitch range S1 have the function similar to that of the keys having dampers in an acoustic piano. When the player depresses the damper pedal DU with his or her foot, the damper effect applied to the first pitch range S1 is released. That is, the damper effect applied to all of the keys KE in the first pitch range S1 is released simultaneously. Release of the damper effect means that control is carried out to achieve the effect similar to the effect achieved in a case where a damper is released from a string corresponding to each key in an acoustic piano. In this state, when the player depresses any key KE in the first pitch range S1 or the second pitch range S2, resonance sounds (string resonance sounds) of all of the pitches are generated. In a case where any key KE is depressed by the player, resonance sounds (string resonance sounds) of all of the pitches are generated in the second pitch range S2 regardless of whether the damper pedal DU is operated.

When the player releases his or her foot from the damper pedal DU, the damper effect is applied to the first pitch range S1. Application of the damper effect means that control is carried out to achieve the effect similar to the effect achieved in a case where a damper is in contact with a string corresponding to each key in an acoustic piano. The performance operator 2 that receives an operation of applying and releasing the damper effect may be other than a pedal such as a switch or a button.

(3) Functional Configuration of Resonance Sound Signal Generation Device 100

Figure 3:
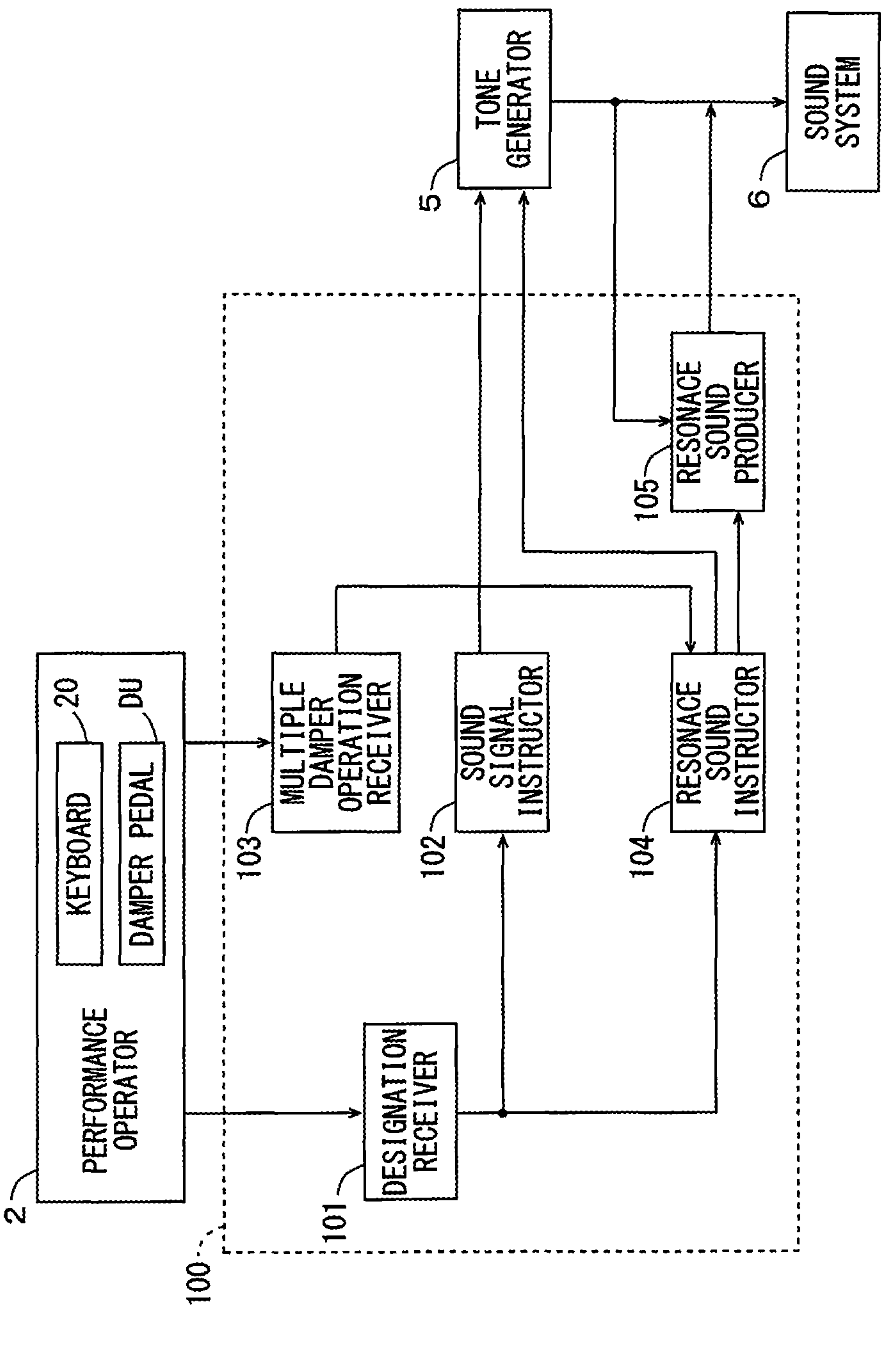
FIG. 3 is a block diagram showing the functional configuration of the resonance sound signal generation device and peripheral devices according to the embodiment.

FIG. 3 is a block diagram showing the functional configuration of the resonance sound signal generation device 100 and its peripheral devices. As shown in FIG. 3, the resonance sound signal generation device 100 includes a designation receiver 101, a sound signal instructor 102, a multiple damper operation receiver 103, a resonance sound instructor 104 and a resonance sound producer 105. The function of each constituent element (101 to 105) of the resonance sound signal generation device 100 is realized when the CPU 8 of FIG. 1 executes the resonance sound signal generation program P1 stored in the storage device 7 or the ROM 11 while using the RAM 10 as a working area.

When the player depresses a key KE of the keyboard 20, a note-on event (hereinafter abbreviated as a note-on) including the pitch corresponding to the depressed key KE is generated. The note-on corresponds to a state transition of the key KE from an OFF state to an ON state. Further, when the player releases a key KE of the keyboard 20, a note-off event (hereinafter abbreviated as a note-off) including the pitch corresponding to the released key KE is generated. The note-off corresponds to the transition of the key KE from the ON state to the OFF state.

The designation receiver 101 receives operation information of a key KE included in the keyboard 20. The operation information of a key KE includes information relating to a pitch, a note-on, a note-off and operation intensity of the key KE. The designation receiver 101 supplies the received operation information to the sound signal instructor 102 and the resonance sound instructor 104.

The sound signal instructor 102 instructs the tone generator 5 to generate the sound signal corresponding to a received pitch based on the operation information supplied from the designation receiver 101. In a case where a note-on of any pitch is represented in the operation information, the sound signal instructor 102 instructs the tone generator 5 to generate the sound signal of the received pitch. In a case where a note-off of any pitch is represented in the operation information, the sound signal instructor 102 instructs the tone generator 5 to stop the sound signal of the received pitch.

The multiple damper operation receiver 103 receives the operation information of the damper pedal DU. The operation information of the damper pedal DU includes the information relating to a damper pedal-on, a damper pedal-off and operation intensity of the damper pedal DU.

The resonance sound instructor 104 receives the operation information of a key KE from the designation receiver 101. Further, the resonance sound instructor 104 receives a production instruction of a resonance sound signal from the multiple damper operation receiver 103. The resonance sound instructor 104 instructs the tone generator 5 to output a sound signal of an additional sound relating to a multiple damper operation. The resonance sound instructor 104 instructs the resonance sound producer 105 to produce or stop a resonance sound signal.

The resonance sound producer 105 produces a resonance sound signal based on the instruction provided by the resonance sound instructor 104. The resonance sound signal produced by the resonance sound producer 105 includes two types that are a resonance sound signal on the basis of string resonance and a resonance sound signal on the basis of an additional sound of a multiple damper operation. In the present embodiment, an operation of simultaneously turning ON or OFF the damper effect with respect to all of the keys KE by operating the damper pedal DU is differentiated from an operation performed at the time of normal key depression (an operation of individually turning ON or OFF the damper effect with respect to a depressed key KE) and referred to as a "multiple damper operation."

A resonance sound signal on the basis of string resonance is a sound signal that simulates the sound that is produced by vibration of the string of the key KE from which a damper effect is released based on a sound signal on the basis of a depressed key KE. The sound signal (the sound signal corresponding to a received pitch) that is output from the tone generator 5 based on an instruction provided by the sound signal instructor 102 is supplied to the sound system 6 and the resonance sound producer 105. In a case where being output from the tone generator 5, sound signals of a plurality of pitches are supplied to the resonance sound producer 105. Based on a generation instruction of a resonance sound received from the resonance sound instructor 104 and a sound signal supplied from the tone generator 5, the resonance sound producer 105 produces a resonance sound signal on the basis of string resonance.

Specifically, in a case where the damper pedal DU is not depressed (in a case where the damper effect is applied to the first pitch range S1), the resonance sound instructor 104 instructs the resonance sound producer 105 to produce resonance sound signals to be generated on a received pitch and pitches in the second pitch range S2 based on the received pitch. In a case where the damper pedal DU is depressed (in a case where application of the damper effect in the first pitch range S1 is released), the resonance sound instructor 104 instructs the resonance sound producer 105 to produce resonance sound signals to be generated on all pitches based on the received pitch.

A resonance sound signal on the basis of an additional sound of a multiple damper operation is the resonance sound signal produced based on the additional sound generated by an operation of depressing the damper pedal DU (an ON operation) or an operation of releasing the depression of the damper pedal DU (an OFF operation). The sound signal of the additional sound generated by the ON operation of the damper pedal DU or the sound signal of the additional sound generated by the OFF operation of the damper pedal DU is stored in the tone generator 5 in advance. The resonance sound producer 105 produces a resonance sound signal based on a generation instruction of a resonance sound received from the resonance sound instructor 104 and a sound signal of an additional sound of the damper pedal DU supplied from the tone generator 5.

In the present embodiment, a sound signal obtained by digitalization of an additional sound of a multiple damper operation that is recorded in advance at a predetermined sampling rate is stored in the tone generator 5. That is, the additional sound generated by an ON operation of the damper pedal DU and the additional sound generated by an OFF operation of the damper pedal DU are respectively stored in the tone generator 5 as sample waveforms.

(4) One Example of Resonance Sound Signal Generation Method

Figure 4:
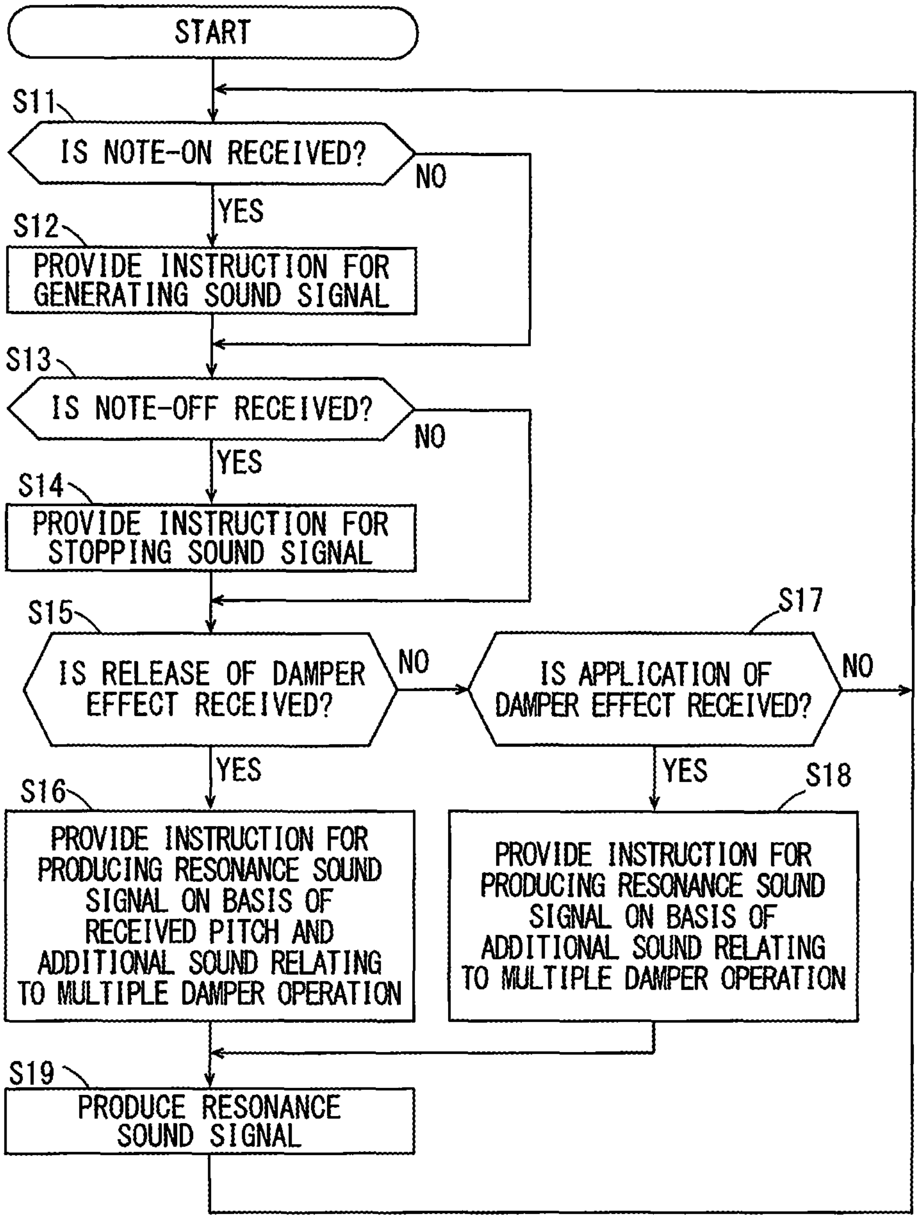
FIG. 4 is a flowchart showing a resonance sound signal generation method to be performed in the resonance sound signal generation device according to the embodiment.
Figure 5:
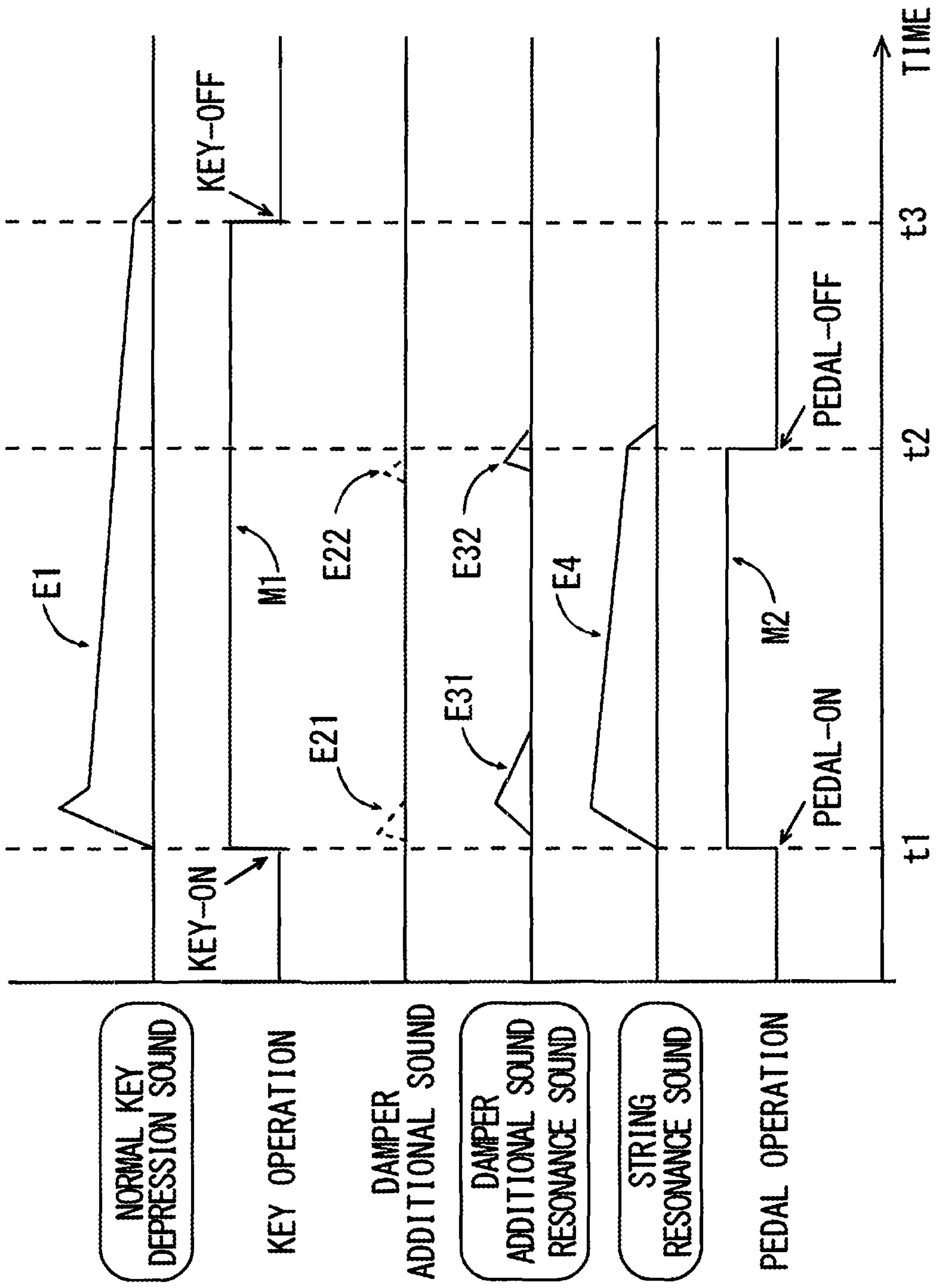
FIG. 5 is a diagram showing the envelope waveform of a sound signal to be generated in an electronic musical apparatus according to the embodiment.

FIG. 4 is a flowchart showing the resonance sound signal generation method performed in the resonance sound signal generation device 100 of FIG. 3. The resonance sound signal generation method of FIG. 4 is performed when the CPU 8 of FIG. 1 executes the resonance sound signal generation program P1 stored in the storage device 7 or the ROM 11. FIG. 5 is a diagram showing envelope waveforms of the sound signals output from the tone generator 5 and the resonance sound signals output from the resonance sound producer 105.

Reference is made to FIG. 4. First, the designation receiver 101 determines whether the operation information representing a note-on is received (step S11). When the player depresses any key KE of the keyboard 20, the performance operator 2 supplies the operation information representing a note-on of the pitch corresponding to the depressed key KE to the designation receiver 101.

In a case where the designation receiver 101 does not receive the operation information representing a note-on, the process proceeds to the step S13.

In a case where the designation receiver 101 receives the operation information representing a note-on, the operation information representing a note-on is supplied to the sound signal instructor 102. The sound signal instructor 102 instructs the tone generator 5 to output the sound signal corresponding to the received pitch (step S12). Thus, the tone generator 5 outputs the sound signal corresponding to the received pitch to the sound system 6. The sound system 6 converts the sound signal into an analog sound signal and outputs the sound corresponding to the converted analog sound signal from the speaker. Thus, the sound corresponding to the key KE depressed by the player is output from the sound system 6.

Next, the designation receiver 101 determines whether the operation information representing a note-off is received (step S13). When the player releases any key KE of the keyboard 20, the performance operator 2 supplies the operation information representing a note-off of the pitch corresponding to the released key KE to the designation receiver 101.

In a case where the designation receiver 101 does not receive the operation information representing a note-off, the process proceeds to the step S15.

In a case where the designation receiver 101 receives the operation information representing a note-off, the operation information representing a note-off is supplied to the sound signal instructor 102. The sound signal instructor 102 instructs the tone generator 5 to stop the sound signal corresponding to the received pitch (step S14). Thus, the tone generator 5 stops the output of the sound signal corresponding to the received pitch to the sound system 6.

In FIG. 5, a waveform E1 represents the envelope waveform of a sound signal of a normal depression sound. Further, M1 represents an operation state of ON/OFF of a key KE in FIG. 5. In FIG. 5, a key KE is depressed (key-ON) at a point t1 in time, and a key KE is released (key-OFF) at a point t3 in time. That is, a note-on event is generated at the point t1 in time, and a note-off event is generated at the point t3 in time. The key is being depressed in the period from the point t1 to the point t3 in time.

The waveform E1 of the normal depression sound includes an attack phase in which there is a sudden increase of signal intensity after depression of the key KE and a decay phase in which there is a quick fall of signal intensity after the attack. Thereafter, the waveform E1 includes a sustain phase in which the signal intensity decreases gradually. Then, the waveform E1 includes a release phase in which the signal intensity falls to the minimum level after release of the key KE.

Next, the multiple damper operation receiver 103 determines whether release of the damper effect is received (step S15). That is, the multiple damper operation receiver 103 determines whether an ON operation of the damper pedal DU (an operation of depressing the damper pedal DU by the player) is received. When the multiple damper operation receiver 103 receives the release of the damper effect, the resonance sound instructor 104 instructs the tone generator 5 and the resonance sound producer 105 to produce the resonance sound signals on the basis of a received pitch and an additional sound relating to a multiple damper operation (step S16). Specifically, the resonance sound instructor 104 provides an instruction for producing a resonance sound signal on the basis of string resonance and producing a resonance sound signal on the basis of an additional sound simulating a rubbing sound generated by an ON operation of the damper pedal DU.

In response to receiving the instruction from the resonance sound instructor 104, the tone generator 5 outputs the sound signal of the received pitch and the sound signal of the additional sound relating to the multiple damper operation to the resonance sound producer 105. The received pitch is the sound corresponding to the note-on received by the designation receiver 101. Further, an additional sound relating to a multiple damper operation is the sound simulating a rubbing sound generated by an ON operation of the damper pedal DU. In response to being instructed by the resonance sound instructor 104, the resonance sound producer 105 produces resonance sound signals on the basis of the sound signal of the received pitch and the sound signal of the additional sound (step S19). The resonance sound producer 105 outputs the resonance sound signal on the basis of the sound signal of the received pitch and the resonance sound signal on the basis of the sound signal of the additional sound to the sound system 6. The sound system 6 converts the resonance sound signals into analog sound signals, and outputs the sounds corresponding to the converted analog sound signals from the speaker. Thus, the resonance sound (string resonance sound) on the basis of the pitch corresponding to the note-on is output from the sound system 6. Further, the resonance sound of the additional sound relating to the operation of the damper pedal DU by the player is output from the sound system 6.

In the step S15, in a case where not receiving release of the damper effect, the multiple damper operation receiver 103 determines whether application of the damper effect is received (step S17). That is, the multiple damper operation receiver 103 determines whether an OFF operation of the damper pedal DU (an operation of releasing the depressing operation of the damper pedal DU by the player) is received. When the multiple damper operation receiver 103 receives application of the damper effect, the resonance sound instructor 104 instructs the tone generator 5 and the resonance sound producer 105 to produce the resonance sound signal on the basis of the additional sound in regard to the multiple damper operation (step S18). Specifically, the resonance sound instructor 104 provides an instruction for producing the resonance sound signal on the basis of the additional sound simulating the rubbing sound generated by an OFF operation of the damper pedal DU.

In response to receiving the instruction from the resonance sound instructor 104, the tone generator 5 outputs the sound signal of the additional sound relating to the multiple damper operation to the resonance sound producer 105. Specifically, the tone generator 5 outputs the sound signal of the additional sound simulating the contact sound generated by an OFF operation of the damper pedal DU to the resonance sound producer 105. In response to being instructed by the resonance sound instructor 104, the resonance sound producer 105 produces the resonance sound signal on the basis of the sound signal of the additional sound supplied from the tone generator 5 (step S19). The resonance sound producer 105 outputs the resonance sound signal on the basis of the sound signal of the additional sound to the sound system 6. Thus, the additional sound relating to the operation of the damper pedal DU performed by the player is output from the sound system 6 as the resonance sound signal.

In FIG. 5, a waveform E21 represents the envelope waveform of a sound signal simulating an additional sound generated by release of the damper effect. A waveform E22 represents the envelope waveform of a sound signal simulating an additional sound generated by application of the damper effect. Further, in FIG. 5, M2 represents the ON and OFF operation states of the damper pedal DU. In FIG. 5, the damper pedal DU is depressed (pedal-ON) at the point t1 in time, and depression of the damper pedal DU is released (pedal-OFF) at a point t2 in time. The damper pedal DU is continuously depressed in the period from the point t1 to the point t2 in time. Specifically, the operation of depressing the damper pedal DU is released from a point in time slightly earlier than the point t2 in time, and the damper pedal DU is completely released at the point t2 in time.

A waveform E31 is the envelope waveform of the resonance sound signal produced on the basis of the sound signal of the additional sound represented by the waveform E21. That is, the waveform E31 represents the resonance sound on the basis of the additional sound generated by release of the damper effect. A waveform E32 is the envelope waveform of the resonance sound signal produced on the basis of the sound signal of the additional sound represented by the waveform E22. That is, the waveform E32 represents the resonance sound on the basis of the additional sound generated by application of the damper effect. In the present embodiment, an additional sound itself relating to an operation of the damper pedal DU is not generated, and the resonance sound based on the additional sound is generated. That is, the sound signals represented by the waveform E21 and the waveform E22 are not generated, and the resonance sound signals generated based on the waveform E21 and the waveform E22 are generated. Thus, the player can obtain a performance feeling more similar to an acoustic piano. A waveform E4 is the envelope waveform of the resonance sound signal produced on the basis of the sound signal of a received pitch.

(5) Effects

According to the present embodiment, the resonance sound signal generation device 100 produces a resonance sound signal based on an additional sound relating to a multiple damper operation. Specifically, in the case where the damper pedal DU is depressed by the player, the resonance sound signal is produced on the basis of the additional sound simulating a rubbing sound generated by release of the damper effect. In a case where depression of the damper pedal DU is released by the player, a resonance sound signal is produced on the basis of the additional sound simulating a contact sound generated by application of the damper effect. Thus, a resonance sound to be generated in a natural keyboard musical instrument such as an acoustic piano can be reproduced more authentically. The player can obtain a performance feeling similar to that of an acoustic piano.

Further, according to the present embodiment, the resonance sound signal generation device 100 produces a resonance sound signal based on a received pitch. The player can obtain a performance feeling similar to that of an acoustic piano.

In the above-mentioned embodiment, the additional sounds relating to multiple damper operations are stored in the tone generator 5 in advance as the sound signals of the sample waveforms by way of example. In another embodiment, an additional sound relating to a multiple damper operation may be produced by execution of a waveform process on random noise. In this case, the tone generator 5 may include a production circuit for random noise and a control circuit for controlling an envelope waveform of random noise. The control circuit executes a filter process on random noise and the waveform process of controlling an envelope waveform, and produces a sound signal simulating an additional sound relating to a multiple damper operation.

Further, in another embodiment, different additional sounds may be prepared for different pitches. For example, in a case where an additional sound is stored in the tone generator 5 as a sound signal of a sample waveform in advance as described in the above-mentioned embodiment, sound signals of a plurality of types of additional sounds are stored in the tone generator 5 in advance. The tone generator 5 outputs the plurality of types of additional sounds to the resonance sound producer 105. The resonance sound producer 105 produces the resonance sound signals on the basis of the plurality of types of additional sounds. An additional sound may be prepared for each pitch, or may be prepared for each sound range including a plurality of pitches. Although a plurality of additional sounds may be mixed at the same ratio then, a resonance sound signal may be produced by mixture of a plurality of additional sounds at predetermined different rates.

Further, in another embodiment, an additional sound may be produced by combination of a plurality of sounds. For example, in a case where an additional sound is stored in the tone generator 5 as a sound signal of a sample waveform in advance as described in the above-mentioned embodiment, a plurality of types of sound signals are stored in the tone generator 5 in advance. The tone generator 5 produces an additional sound by combining a plurality of types of sound signals at a predetermined ratio and outputs the produced additional sound to the resonance sound producer 105. The resonance sound producer 105 produces a resonance sound signal based on the combined additional sound.

Further, in another embodiment, an additional sound may be adjusted by behavior of a multiple damper operation. For example, two different types of additional sounds relating to a multiple damper operation are prepared. In a case where acceleration of the multiple damper operation is equal to or larger than a predetermined threshold value, both two types of additional sounds are output to the resonance sound producer 105, and a resonance sound signal is produced on the basis of the two types of additional sounds in the resonance sound producer 105. In a case where the acceleration of the multiple damper operation is smaller than the predetermined threshold value, only one of the two types of additional sounds is output to the resonance sound producer 105, and a resonance sound signal is produced on the basis of the one additional sound in the resonance sound producer 105. Further, the larger the acceleration of the multiple damper operation is, the larger the volume of the resonance sound may be controlled to be.

Further, in the above-mentioned embodiment, only the resonance sound based on the additional sound is output from the sound system 6 without production of the additional sound itself relating to the multiple damper operation. In another embodiment, the additional sound relating to a multiple damper operation and the resonance sound on the basis of the additional sound may be mixed at a predetermined ratio and output from the sound system 6.

The resonance sound producer 105 of the present embodiment produces a resonance sound signal based on an additional sound relating to a multiple damper operation when the damper pedal DU is operated. The additional sound is the sound simulating a rubbing sound when the damper is released from all of the keys KE by an operation of the damper pedal DU. Therefore, in a case where the damper pedal DU is depressed with all of the keys KE depressed, the resonance sound producer 105 may be prevented from producing a resonance sound signal based on an additional sound. Because all of the keys KE being depressed means that the damper is already released from all of the keys KE.

In the above-mentioned embodiment, the resonance sound signal on the basis of the additional sound relating to a damper operation is to be generated regardless of absence or presence of a key depression operation. In another embodiment, the resonance sound producer 105 may produce a resonance sound signal on the basis of an additional sound in association with acquisition of operation information of a key depression.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

We claim:

1. A resonance sound signal generation method comprising:

providing, using a sound signal instructor, an instruction configured to generate a sound signal corresponding to a received pitch;

producing, using a resonance sound producer, a resonance sound signal;

receiving, using a multiple damper operation receiver, a multiple damper operation with respect to a plurality of pitches in a first pitch range;

providing, using a resonance sound instructor, an instruction configured to produce, using a resonance sound signal generation apparatus, the resonance sound signal based on an additional sound relating to the multiple damper operation when the multiple damper operation is received, wherein an envelope waveform of the resonance sound signal is produced based on a sound signal of the additional sound, and the additional sound is in turn produced by carrying out waveform processing of a random noise; and outputting a simulated sound that is associated with a damper effect and the resonance sound signal, using a tone generator to thereby improve sound authenticity.

2. The resonance sound signal according to claim 1, wherein the additional sound includes a sample waveform produced in advance.

3. The resonance sound signal generation method according to claim 1, wherein the additional sound is produced by combination of a plurality of types of sounds.

4. The resonance sound signal generation method according to claim 1, wherein the additional sound is controlled in accordance with operation information of the multiple damper operation.

5. The resonance sound signal generation method according to claim 1, wherein providing an instruction configured to produce the resonance sound signal comprises providing an instruction configured to combine the additional sound at a predetermined ratio with the resonance sound signal which is produced based on the additional sound.

6. The resonance sound signal generation method according to claim 1, wherein receiving the multiple damper operation includes receiving an application or release of a damper effect with respect to a plurality of pitches in the first pitch range to which the damper effect is applied.

7. The resonance sound signal according to claim 1, wherein the additional sound relating to an operation of a damper pedal DU is not generated, and the resonance sound based on release of a damper effect and application of the damper effect are generated.

8. The resonance sound signal generation method according to claim 1, further comprising producing the resonance sound signal based on an outputted sound signal corresponding to the received pitch and the resonance sound signal based on an outputted additional sound relating to the multiple damper operation.

9. A resonance sound signal generation device comprising:

a sound signal instructor that provides an instruction for generating a sound signal corresponding to a received pitch;

a resonance sound producer that produces a resonance sound signal based on: i) string resonance, or ii) an ON operation of a damper pedal;

a multiple damper operation receiver that receives a multiple damper operation with respect to a plurality of pitches in a first pitch range; and a resonance sound instructor that instructs the resonance sound producer to produce the resonance sound signal based on the ON operation of the damper pedal when the multiple damper operation is received in the multiple damper operation receiver, wherein an envelope waveform of the resonance sound signal is produced based on a sound signal of the additional sound, and the additional sound is in turn produced by carrying out waveform processing of a random noise; and a simulated sound that is associated with a damper effect and the resonance sound is generated using a tone generator to thereby improve sound authenticity.

10. An electronic musical apparatus comprising:

the resonance sound signal generation device according to claim 9;

a tone generator that generates the sound signal of the additional sound as instructed by the resonance sound signal generation device; and an outputter that outputs a resonance sound of the additional sound based on the resonance sound signal produced by the resonance sound signal generation device.

11. The resonance sound signal generation device according to claim 9, wherein the additional sound relating to an operation of a damper pedal DU is not generated, and the resonance sound based on release of a damper effect and application of the damper effect are generated.

12. A non-transitory computer readable storage medium storing a resonance sound signal generation program that causes a computer to execute a process of:

providing, using a sound signal instructor, an instruction configured to generate a sound signal corresponding to a received pitch;

producing, using a resonance sound producer, a resonance sound signal;

receiving, using a multiple damper operation receiver, a multiple damper operation with respect to a plurality of pitches in a first pitch range; and providing, using a resonance sound instructor, an instruction configured to produce the resonance sound signal based on an additional sound relating to the multiple damper operation when the multiple damper operation is received, wherein an envelope waveform of the resonance sound signal is produced based on a sound signal of the additional sound, and the additional sound is in turn produced by carrying out waveform processing of a random noise; and outputting a simulated sound associated with a damper effect and the resonance sound signal, using a tone generator to thereby improve sound authenticity.

13. The non-transitory computer readable storage medium according to claim 12, wherein the resonance sound signal generation program also causes the computer to execute a process of generating the resonance sound based on release of a damper effect and application of the damper effect, while the additional sound relating to an operation of a damper pedal DU is not generated.

* * * * *